(12) United States Patent
Makino et al.

(10) Patent No.: US 6,517,328 B2
(45) Date of Patent: Feb. 11, 2003

(54) COMPRESSOR AND AN ELECTRIC MOTOR WITH AN INSULATIVE, NON-CONDUCTIVE MEMBER INSERTED BETWEEN THE STATOR AND THE MOTOR HOUSING

(75) Inventors: Masahiko Makino, Shiga (JP); Tatsuhisa Taguchi, Kusatsu (JP); Nobuaki Ogawa, Otsu (JP); Hisakazu Kataoka, Takefu (JP); Yoshinari Asano, Takefu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/824,247

(22) Filed: Apr. 3, 2001

(65) Prior Publication Data

US 2001/0038797 A1 Nov. 8, 2001

(30) Foreign Application Priority Data

Apr. 6, 2000 (JP) ....................................... 2000-105037

(51) Int. Cl.[7] ............................................... F04B 17/03
(52) U.S. Cl. ............................... 417/410.1; 417/410.5; 310/43; 310/51; 310/216
(58) Field of Search .................... 47/410.5, 410.1, 47/363; 380/43, 51, 216, 217, 89, 259

(56) References Cited

U.S. PATENT DOCUMENTS

| 1,688,891 | A | | 10/1928 | Spreen | 310/51 |
|---|---|---|---|---|---|
| 1,750,305 | A | | 3/1930 | Gross | 336/219 |
| 2,809,137 | A | | 10/1957 | Robinson | 148/6 |
| 3,229,134 | A | | 1/1966 | Rakula | 310/216 |
| 3,693,035 | A | | 9/1972 | Ostwald | 310/51 |
| 3,766,416 | A | * | 10/1973 | Papst et al. | 310/254 |
| 4,260,916 | A | | 4/1981 | Theissig | 310/50 |
| 4,293,785 | A | * | 10/1981 | Jackson, Jr. | 165/133 |
| 5,038,460 | A | * | 8/1991 | Ide et al. | 264/272.2 |
| 5,470,213 | A | * | 11/1995 | Iguchi et al. | 418/55.2 |
| 5,806,169 | A | * | 9/1998 | Trago et al. | 264/272.2 |
| 5,829,959 | A | * | 11/1998 | Tsubono et al. | 418/55.5 |

FOREIGN PATENT DOCUMENTS

| CH | 306158 | 3/1955 |
|---|---|---|
| DE | 1037572 | 8/1958 |
| GB | 1362184 | 7/1974 |

* cited by examiner

Primary Examiner—Charles G. Freay
Assistant Examiner—Emmanuel Sayoc
(74) Attorney, Agent, or Firm—Greenblum & Bernstein, P.L.C.

(57) ABSTRACT

An electric motor accommodated fixedly in position within its own casing or a housing of a compressor is provided with a non-conductive member between its stator and the casing or the housing, for preventing the stator and the casing or housing from making contact with each other. The non-conductive member is made of a material having a thermal expansion coefficient greater than that of the stator, such as resin.

32 Claims, 8 Drawing Sheets

COMPRESSOR AND AN ELECTRIC MOTOR WITH AN INSULATIVE, NON-CONDUCTIVE MEMBER INSERTED BETWEEN THE STATOR AND THE MOTOR HOUSING

BACKGROUND OF THE INVENTION

1. Technical Field of the Invention

The present invention relates to a compressor and an electric motor for same.

2. Description of Related Art

Compressor includes a compression mechanism and an electric motor for driving same accommodated within a housing. Normally, the stator of the electric motor is fixed to the housing of the compressor by means of shrinkage-fitting, fitting and welding, bolting, or the like, so as to operate efficiently and stably with a certain air gap between itself and the rotor.

Conventional compressor employs thick slot insulating paper or provides a small slot space to prevent current leakage from the electric motor to the housing, thereby compensating the operation efficiency of the electric motor.

Another problem encountered by conventional compressors was the vibration of the electric motor which is directly transmitted to the housing of the compressor and leads to adverse effects on surrounding equipment and which also causes noise. The stator of the electric motor is normally iron-based, whereas the housing to which the stator is fitted is made of non-ferrous metal having a greater coefficient of thermal expansion than iron. Therefore, as the temperature rises with the operation of the electric motor, a gap develops between the housing and the stator due to the difference in thermal expansion thereof. This may cause undesirable backlash and vibration. The difference in thermal expansion coefficient also leads to metal fatigue and decrease in strength of the housing because of the stress caused by repeated expansion and contraction concomitant with activation and deactivation of the electric motor.

SUMMARY OF THE INVENTION

An object of the present invention is to prevent the leakage of current from an electric motor to a compressor housing or a motor casing without deteriorating the operation efficiency of the electric motor.

Another object of the present invention is to prevent backlash, vibration, and decrease in strength in compressors due to temperature rise occurring with the operation of the electric motor.

To achieve the above-described objects, the present invention provides an electric motor accommodated fixedly in position within its own casing or a housing of a compressor, having a non-conductive member between its stator and the casing or the housing, for preventing the stator and the casing or housing from making contact with each other. The non-conductive member is made of a material having a thermal expansion coefficient greater than that of the stator, such as resin.

The housing or the casing is made of a non-ferrous metal material, such as aluminum or magnesium.

The non-conductive member is most preferably made of a resin because of its light weight and high insulation property.

The non-conductive member may also be made of a water glass, because it is stable against heat and is thus useful in shrinkage-fitting the stator to the housing or the casing.

Further, the non-conductive material may be made from an inorganic substance having a thermal expansion coefficient intermediate between the thermal expansion coefficient of the stator and that of the compressor housing or the motor casing by means of vapor-deposition or powder coating. The non-conductive material thus realized is also stable against heat and is thus useful in shrinkage-fitting the stator to the compressor housing or the motor casing.

The foregoing and other objects, features, aspects and advantages of the present invention will become more apparent from the following detailed description of the present invention when taken in conjunction with the accompanying drawings. The features of the present invention may be practiced, where possible, singly, or in combination.

DETAILED DESCRIPTION OF THE PREFERRED EMBODIMENTS

FIGS. 1A, 2, 5, and 7 show scroll-type compressors according to various embodiments of the invention. A compressor according to the invention generally has a housing 1 for accommodating a compression mechanism 2 and an electric motor 3 for driving same through a crank shaft 4. The crank shaft 4 includes a main shaft 4a on its one end on the side of the compression mechanism 2. On one side in a lengthwise direction in the housing 1 is a main bearing member 5, while a sub bearing member 6 is provided on the other side within the housing 1, for supporting the opposite ends of the crank shaft 4.

A stationary scroll 7 is bolted to the main bearing member 5. Between the main bearing member 5 and the stationary scroll 7 is inserted a rotating scroll 8, which meshes with the stationary scroll 7 so as to form a scroll-type compression mechanism 2. Between the rotating scroll 8 and the main bearing member 5 is disposed a rotation restricting mechanism 9 such as an Oldham's ring or the like for preventing the rotating scroll 8 from rotating and for guiding it in circular orbital motion. By the action of the main shaft 4a of the crank shaft 4, the rotating scroll 8 is driven to be decentered, and thereby circular orbital motion is imparted to the rotating scroll 8. At this time, a compression chamber 11, formed between the stationary scroll 7 and the rotating scroll 8, is moved from the outer periphery side to the central region, with a gradual reduction of the volume thereof. A refrigerant, introduced from an inlet-side connection port 12 communicating with outside through the housing 1 and from an inlet hole 13 formed on the outer peripheral portion of the stationary scroll 7, is subjected to compression. The refrigerant, upon compressed to a predetermined volume or above, pushes a reed valve 15 open and is discharged from a discharge port 14 disposed in the central portion of the stationary scroll 7 into the housing 1.

An electric motor 3 is located between the main bearing member 5 and the sub bearing member 6, and is composed of a stator 3a fixedly attached to the housing 1 and a rotor 3b formed integrally around the outer periphery of the central portion of the crank shaft 4. The rotor 3b has a balance weight 16 formed in the outer peripheral portion of its upper and lower end faces. Providing the balance weight 16 assures high stability in the rotary motion of the rotor 3b and the crank shaft 4, and thereby stable circular orbital motion is imparted to the rotating scroll 8.

A pump 17 is provided at one end of the crank shaft 4 opposite from the main shaft 4a. Oil 19 is sucked from an oil reservoir 18 disposed at the bottom portion of the housing 1 into the pump 17, and is supplied through an oil feeding hole 21 piercing through the crank shaft 4 to bearing portions 22 of the components constituting the compression mechanism 2 and the sliding portions of the compression mechanism 2. The oil 19 having passed therethrough is subjected to supply pressure, gravity, or the like, and thereby flows through the bearing portion 22 into the housing 1, and then drips and eventually collects in the oil reservoir 18.

Refrigerant gas discharged from the compression mechanism 2 passes through and thereby cools the electric-motor 3. Then, the refrigerant gas is discharged through a connection port 23 to the outside of the housing 1 so as to serve for the refrigeration cycle.

The housing 1 is formed as a pressure-tight container and is thus thick-walled. To achieve weight reduction, a light-metal material having a specific gravity smaller than that of an iron-based material, for example, aluminum, is employed for the housing of the compressor. A housing made of aluminum needs to have a thicker wall than an iron-based housing and is nevertheless advantageous from a weight standpoint. However, with another features of the present invention, using an iron-based material may not lead to any serious problem in achieving weight reduction, and therefore a metal material used for the housing 1 is not limited to light metal.

A non-conductive material 31 is disposed between the stator 3a of the electric motor 3 and the housing 1 thereof to prevent the stator 3a and the housing 1 from making contact with each other. In this way, electrical insulation is achieved between the stator 3a of the electric motor 3 and the housing 1, and thereby the leakage of current from the electric motor 3, in particular, its stator 3a to the housing 1 is prevented without deteriorating the characteristics of the electric motor 3 as would occur in cases where the winding 3c itself of the stator 3a is subjected to insulation treatment. Therefore, it is possible to free the entire system from damages due to leakage of electricity and decrease in the operation efficiency of the electric motor 3. Although not shown, the present invention is also applicable to an electric motor itself accommodated within its own casing or the like, i.e., the same effects are obtained with the electric motor 3 alone by providing similarly a non-conductive material 31 between the stator 3a and the casing.

Another characteristic feature of the invention is that, while the housing 1 is made of a material having a thermal expansion coefficient greater than that of the iron-based stator 3a of the electric motor 3, the non-conductive material 31 has a thermal expansion coefficient greater than, at least, that of the stator 3a. Therefore, even if, due to heat generation occurring with the operation of the electric motor 3, the housing 1 or the motor casing to which the stator 3a is fitted thermally expands greater than does the stator 3a because of their different thermal expansion coefficients and consequently the gap therebetween increases, the non-conductive material 31 can thermally expand greater than does the stator 3a, and thus the gap is successfully reduced. This prevents backlash, vibration, and noise caused thereby due to temperature rise occurring with the operation of the electric motor 3.

Selecting a light-weight non-ferrous metal material, such as aluminum, for the housing 1 or the motor casing makes the compressor and the electric motor light-weight.

Using resin for the non-conductive material 31 is preferable, because it is light-weight and offers high insulation property, and is thus advantageous for the prevention of the leakage of electricity.

Depending upon the type of resin, by exploiting its fluidity, the resinous non-conductive material 31 can be flowed into the gap between the stator 3a and the housing 1 or the motor casing, or can be applied to one or both of them.

Further, by exploiting the plasticity of resin, the resinous non-conductive material 31 can be molded on the surface of the stator 3a or the like, or can be molded into a film so as to be easily fitted to or wound on the periphery of the stator 3a. It can also be formed into an insulator whose shape is so designed as to cover the stator's end face and the periphery thereof to secure insulation between the iron core edge of the stator 3a and the coil or between the slot and the coil, as desired, or over the stator 3a per se.

Still further, since the resins have higher conformability and cushioning properties derived from resin's elasticity and deformability, the resinous non-conductive material 31 does not require molding with extremely high dimensional accuracy to attain sufficient practicality, and is advantageous for press-fitting the stator 3a to the housing 1 or the motor casing. Moreover, it responds properly to changes in the size of the gap between the stator 3a and the housing 1 or the like, absorbs backlash and vibration to prevent occurrence of noise, and inhibits stress from occurring frequently due to repeated expansion and contraction between the housing 1 or the motor casing and the stator 3a and thereby prevent occurrence of metal fatigue and decrease in strength. In addition, creating unevenness, such as grooves, or slits, or split section in the portion of the non-conducting material that abuts the housing 1, the motor casing, or the stator 3a, and providing a multiplicity of individual air bubbles inside it enhance the cushioning property of the non-conductive material.

As an example of resin used here, epoxy resin, or varnish is suitable for coating.

Examples of polyester resin include polyethylene naphthalate (PEN), polyethylene terephthalate (PET), polybutylene terephthalate (PBT), polyphenylene sulfide (PPS), and the like. These resin material are graded with marks ◉, ○, , and x as shown in Table 1 with respect to the aptitude for various processing and with respect to various characteristics. In point of easiness of molding, PPS and PBT are particularly preferable, both of which are suitable for molding the iron core of the stator 3a and suitable as a material for a molded article, such as an insulator.

TABLE 1

|  | Film | Iron-core Molding | Molded Article (Insulator, etc) | Oligomer Quantity | Low Permittivity | Elasticity |
| --- | --- | --- | --- | --- | --- | --- |
| PEN | ○ |  |  | ○ | ◉ |  |
| PET | ◉ | ○ | ○ |  | ○ | ○ |
| PBT | X | ◉ | ◉ | X |  | ◉ |
| PPS |  | ◉ | ◉ | ◉ | ◉ | X |

For forming a film, PET and PEN are particularly preferable. If the electric motor is an inverter-driven brushless type in which large quantities of high-frequency current are observed, where a leakage of electricity needs to be reduced with greater thoroughness, a PET film may preferably have an independent hole formed inside it. To prevent decrease in the strength, the film may further have a skin layer with no hole formed on its surface. By manufacturing the film having the skin layer under one continuous operation, the permittivity thereof decreases. Further, by forming a hole, a greater elasticity can be obtained.

Resin can have a thermal expansion coefficient greater than that of iron but smaller than that of aluminum by adding glass, calcium carbonate, or the like thereto. It is preferable that thermal expansion coefficient of the resin used be so set as to compensate for the difference between the thermal expansion coefficients of iron and aluminum.

Iron has a thermal expansion coefficient of $1.15 \times 10E-5$ (/deg), and aluminum has a thermal expansion coefficient of $2.313 \times 10E-5$ (/deg). Hereupon, the resin film, when formed from PET, preferably has a thermal expansion coefficient of $2.0 \times 10E-5$ (/deg) by adding glass in the amount of about 30 to 45 wt % thereto, and, when formed from PPS, has the same ranging from $1.6 \times 10E-5$ (/deg) to $1.7 \times 10E-5$ (/deg) by adding glass (inorganic material) thereto in the amount of about 50 wt %.

Figure 1A:
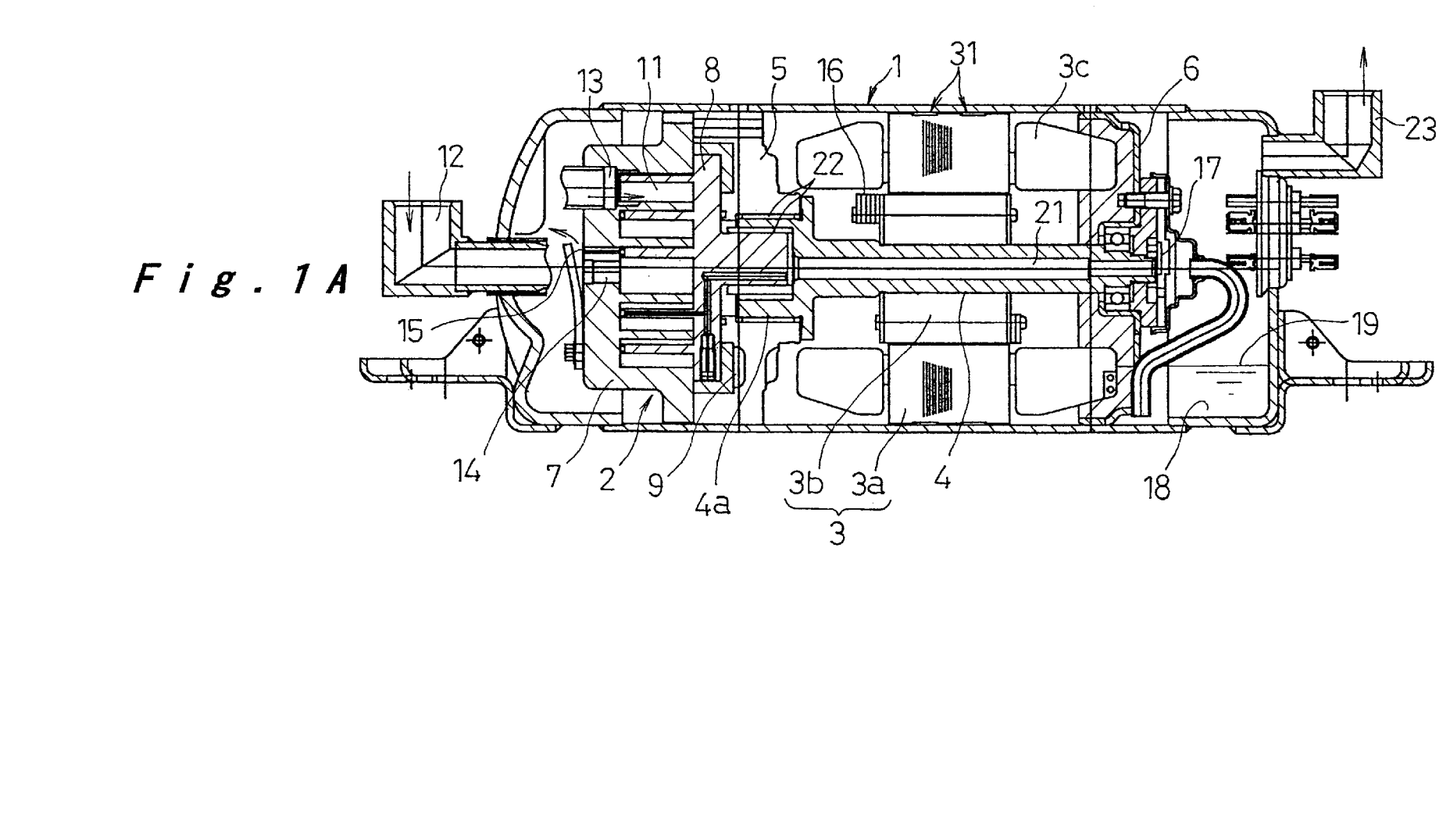
FIGS. 1A and 1B are diagrams illustrating a compressor according to one embodiment of the present invention, with FIG. 1A showing the vertical cross section of the entire system, and FIG. 1B showing the vertical cross section of the principal portion.
Figure 1B:
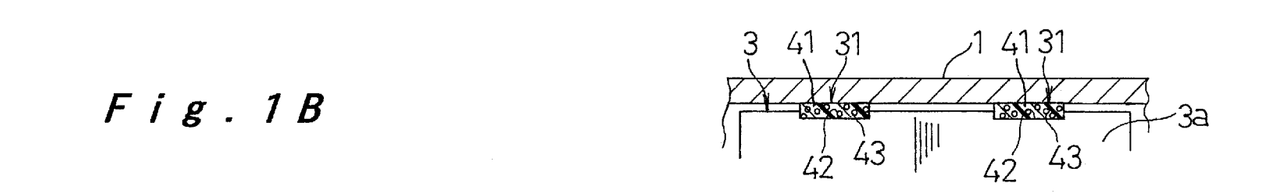

In the example shown in FIGS. 1A and 1B, the non-conductive material 31, or a molded article made of resin is realized as a plurality of annular bands 41 fitted to part of the periphery of the stator 3a. The band 41 is firmly received in an annular recess 42 disposed around the periphery of the stator 3a, and this prevents the elongated band 41 from being displaced when the stator 3a is press-fitted to the inner circumference of the housing 1. The band 41 may be bonded to the stator 3a, thereby eliminating the need for the recess 42. The band 41 is provided with the help of the recess 42 and thus needs to be slightly thick-walled, but after all this allows the band 41 to have independent air bubbles 43 formed inside it. As a result, it excels in vibration-damping characteristics and in fast response to changes in the gap between the stator 3a and the housing 1 due to the thermal expansion, while exerting sufficiently high elasticity, and also inhibits stress from occurring frequently between the housing 1 or the motor casing and the stator 3a. Such independent air bubbles 43 can be applied to any other molded article. Here, PET, PPS, PBT, or the like may be used as exemplary resin. PPS is particularly preferable, because it contains a smaller amount of oligomer and thus, when used in a compressor, rarely causes the capillary to be choked up.

Figure 2:
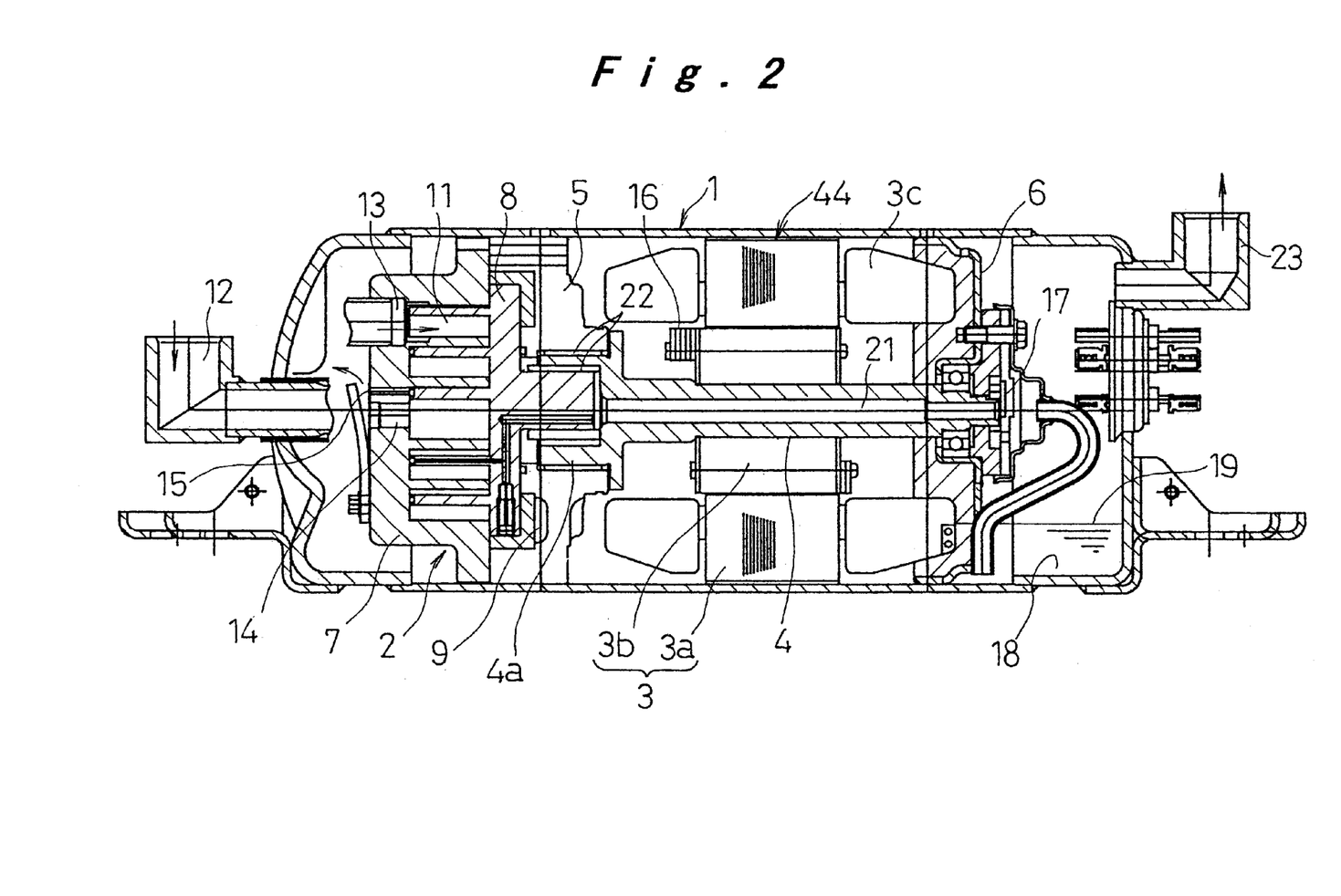
FIG. 2 is a vertical sectional view illustrating a compressor according to another embodiment of the present invention.

In the example shown in FIG. 2, the non-conductive material 31, or a molded article made of resin is realized as a cylinder 44 that is press-fitted to the stator 3a so as to cover substantially the entire surface in the length thereof. The stator 3a, together with the cylinder 44, is firmly press-fitted inside the housing 1. The cylinder 44 is so crimped as to cover substantially the entire periphery of the stator 3a and is thereby prevented from slipping out. This eliminates the need for any additional fixing method other than press fitting to keep the stator 3a and the cylinder 44 in engagement. The cylinder 44 may be fitted to the stator 3a by bonding or by being received in a recess. Also here, PET, PPS, PBT, or the like may be used as exemplary resin. In cases where the cylinder 44 is made thinner so that it is shaped like a film to be fitted to or wound on the periphery of the stator 3a, using a polyester film made of PEN, PET, or the like is preferable, because it requires less cost and is excellent in insulation property despite being thin. Such a polyester film may have the aforementioned independent air bubbles formed inside it.

Figure 3:
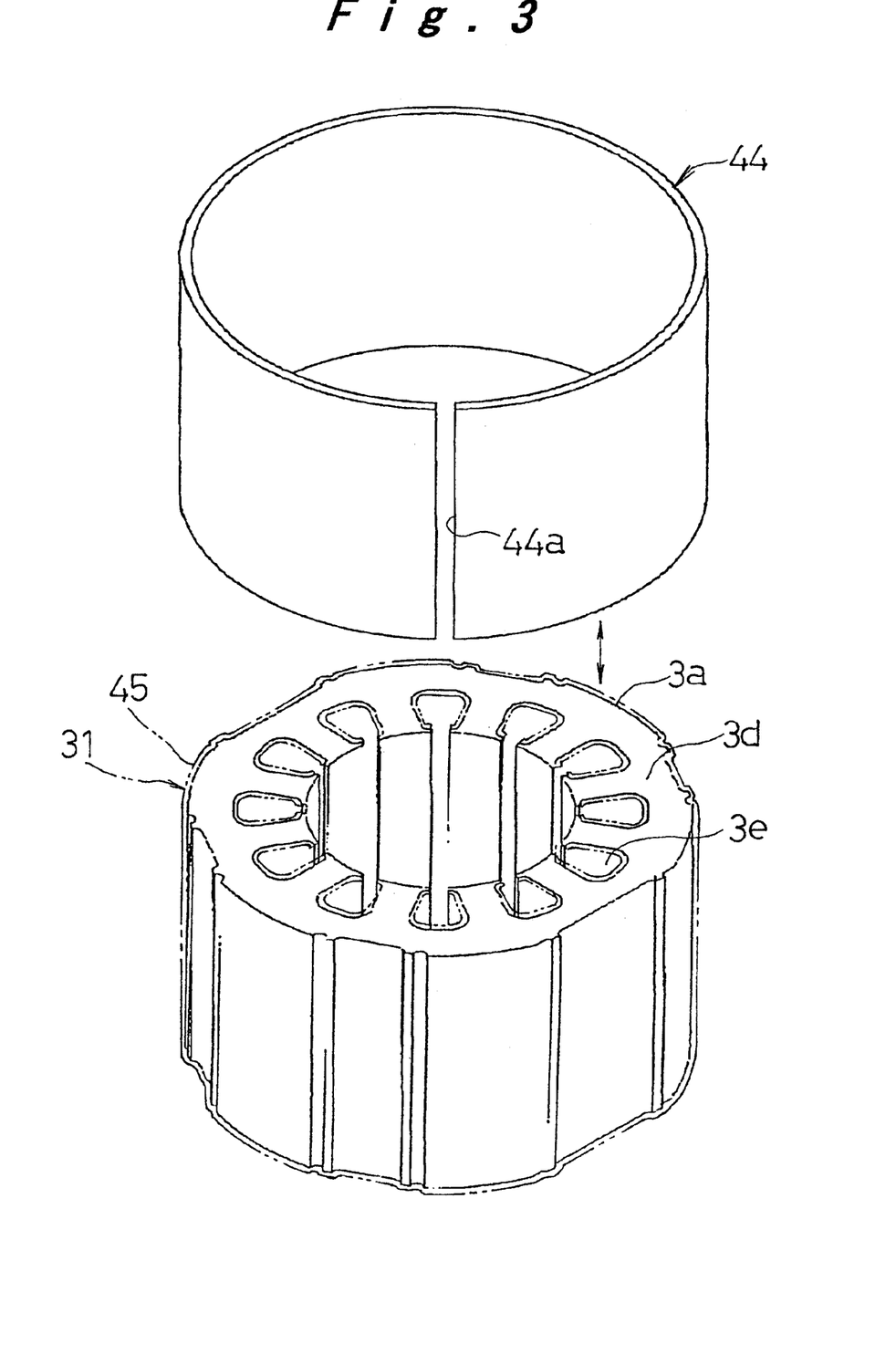
FIG. 3 is a perspective view illustrating the combination relationship between a stator and a non-conductive material employed in a compressor according to further embodiments of the present invention.

In the example shown in FIG. 3, the cylinder 44 has the same structure as that of the example shown in FIG. 2 except that it has a split section 44a formed in part of its circumferential surface so as to respond properly to the thermal expansion and contraction of the housing 1 and the stator 3a and enhance vibration-damping characteristics.

When the resin used for the non-conductive material 31 is selected from among PPS, PET, and PBT, by exploiting its excellent moldability, as indicated by a virtual line shown in FIG. 3, it is possible to shape the non-conductive material 31 into a molded layer 45 molded on the surface of the stator 3a. In this case, the entire stator 3a, excluding its periphery, from the end face 3d to the inner surface of the slot 3e is successfully insulated.

Figure 4:
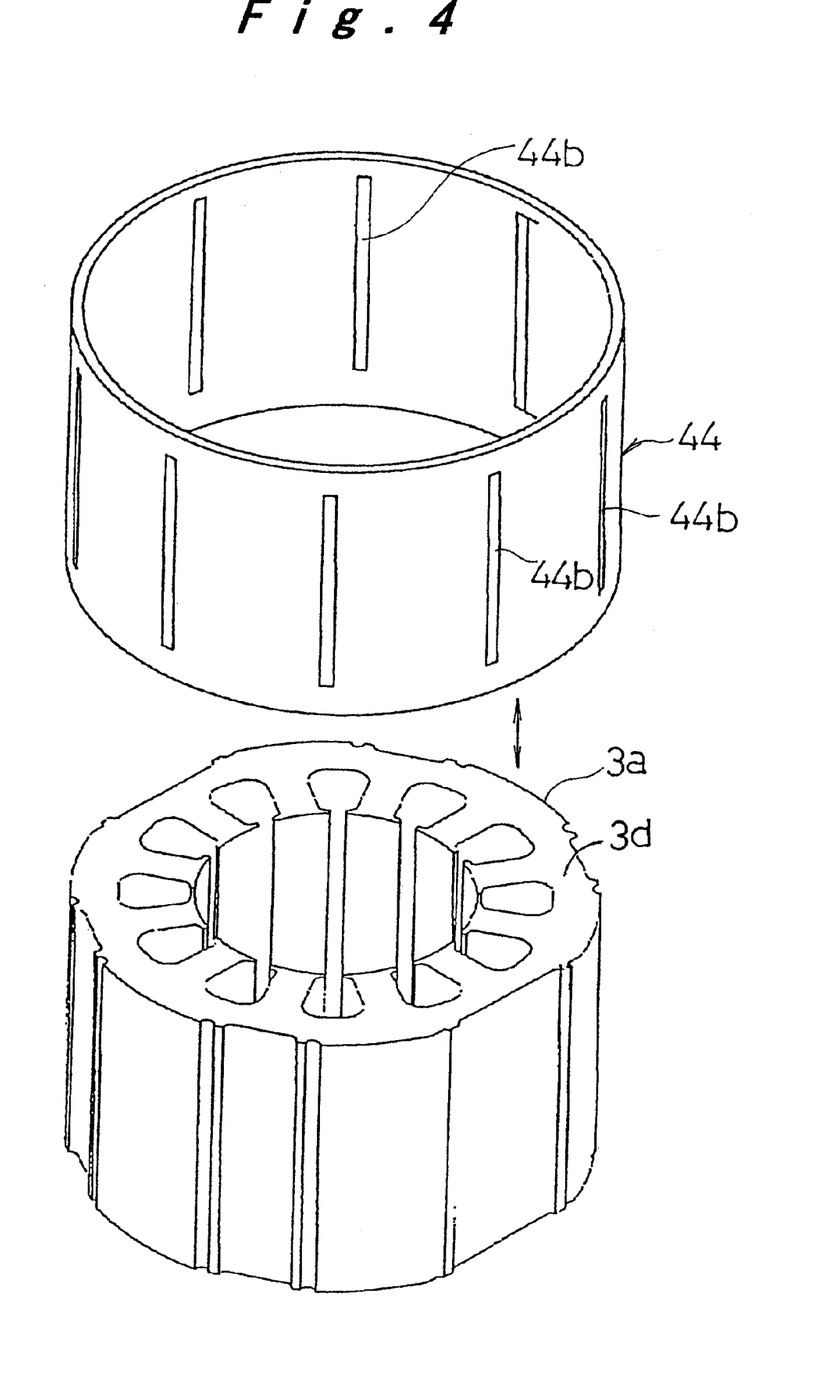
FIG. 4 is a perspective view illustrating the combination relationship between a stator and a non-conductive material employed in a compressor according to another embodiment of the present invention.

In the example shown in FIG. 4, the cylinder 44 has the same structure as that of the example shown in FIG. 2 except that it has axially-extending slits 44b formed in several positions around its circumferential surface. This allows the cylinder 44 to expand freely between the housing 1 and the stator 3a so that it can respond properly to the thermal expansion and contraction thereof and enhance vibration-damping characteristics.

Figure 5:
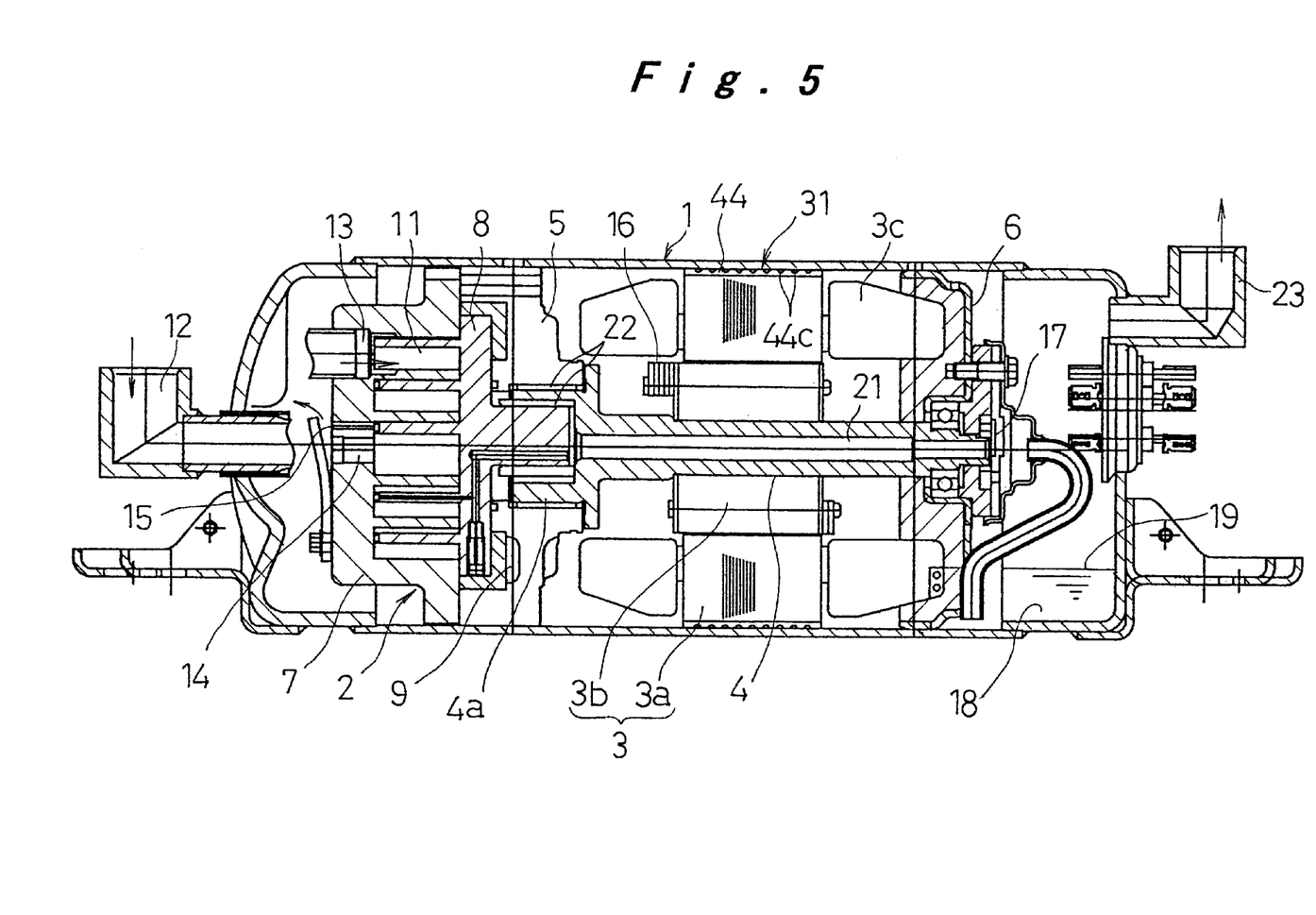
FIG. 5 is a vertical sectional view illustrating a compressor according to yet another embodiment of the present invention.
Figure 6:
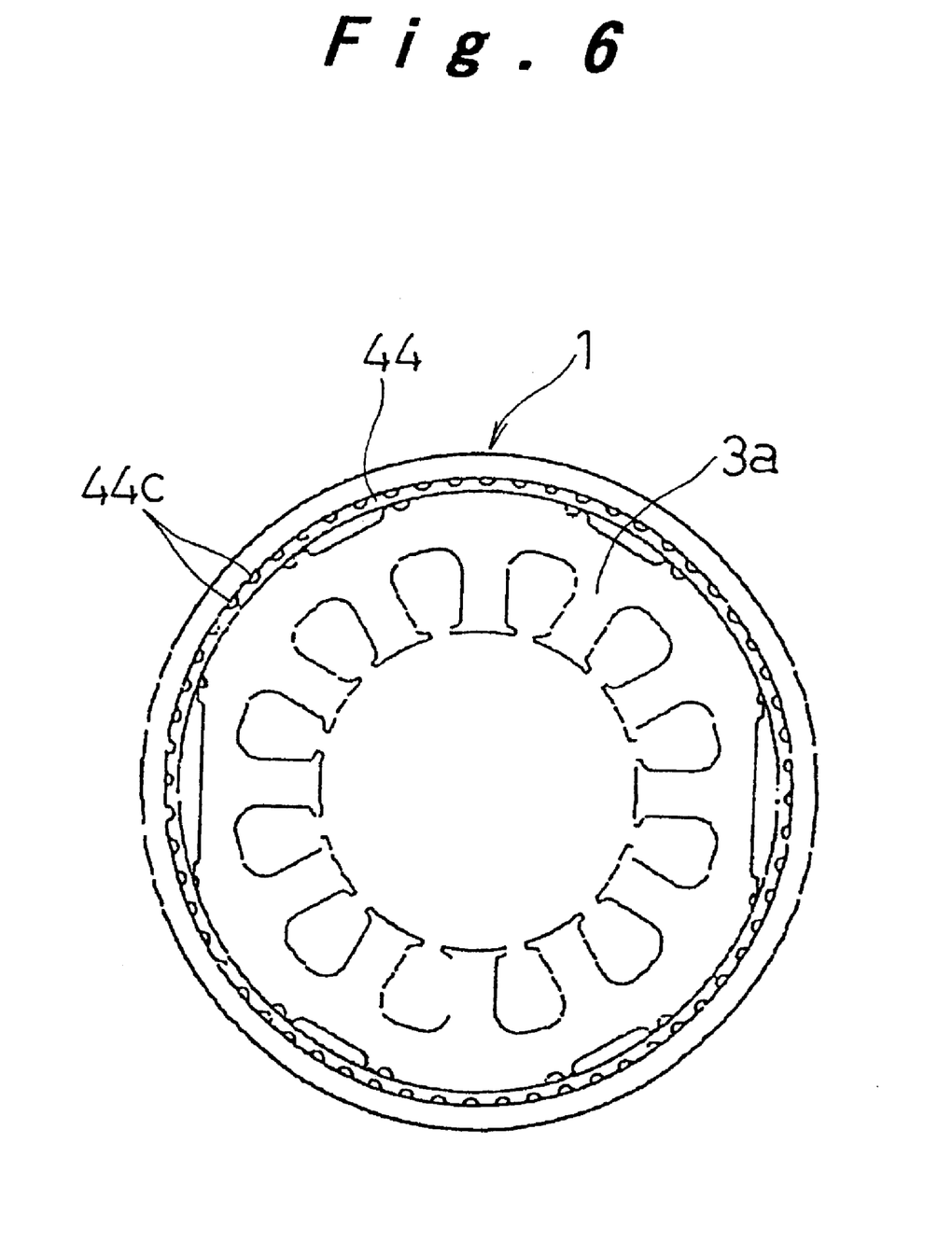
FIG. 6 is a horizontal sectional view illustrating components, excluding a rotor, incorporated in an electric motor employed in a compressor according to a further embodiment of the present invention.

In the example shown in FIG. 5, the cylinder 44 has the same structure as that of the example shown in FIG. 2 except that it has annular or partially-interrupted grooves 44c formed in part of its periphery abutting the inner circumference of the housing 1 so as to create unevenness. This allows the cylinder 44 to expand freely between the housing 1 and the stator 3a so that it can respond properly to the thermal expansion and contraction thereof and enhance vibration-damping characteristics. The grooves 44c may be formed in the inner circumference or in both of the inner and outer circumferences of the cylinder 44. They may also be, as shown in FIG. 6, formed in the axial direction of the stator 3a. In this case, the grooves 44c can act as passageways for a refrigerant insofar as they are formed continuously. In addition, depending on the wall-thickness of the cylinder 44, through holes may be provided instead of the grooves 44c. The through holes may also be provided together with the grooves 44c.

Figure 7:
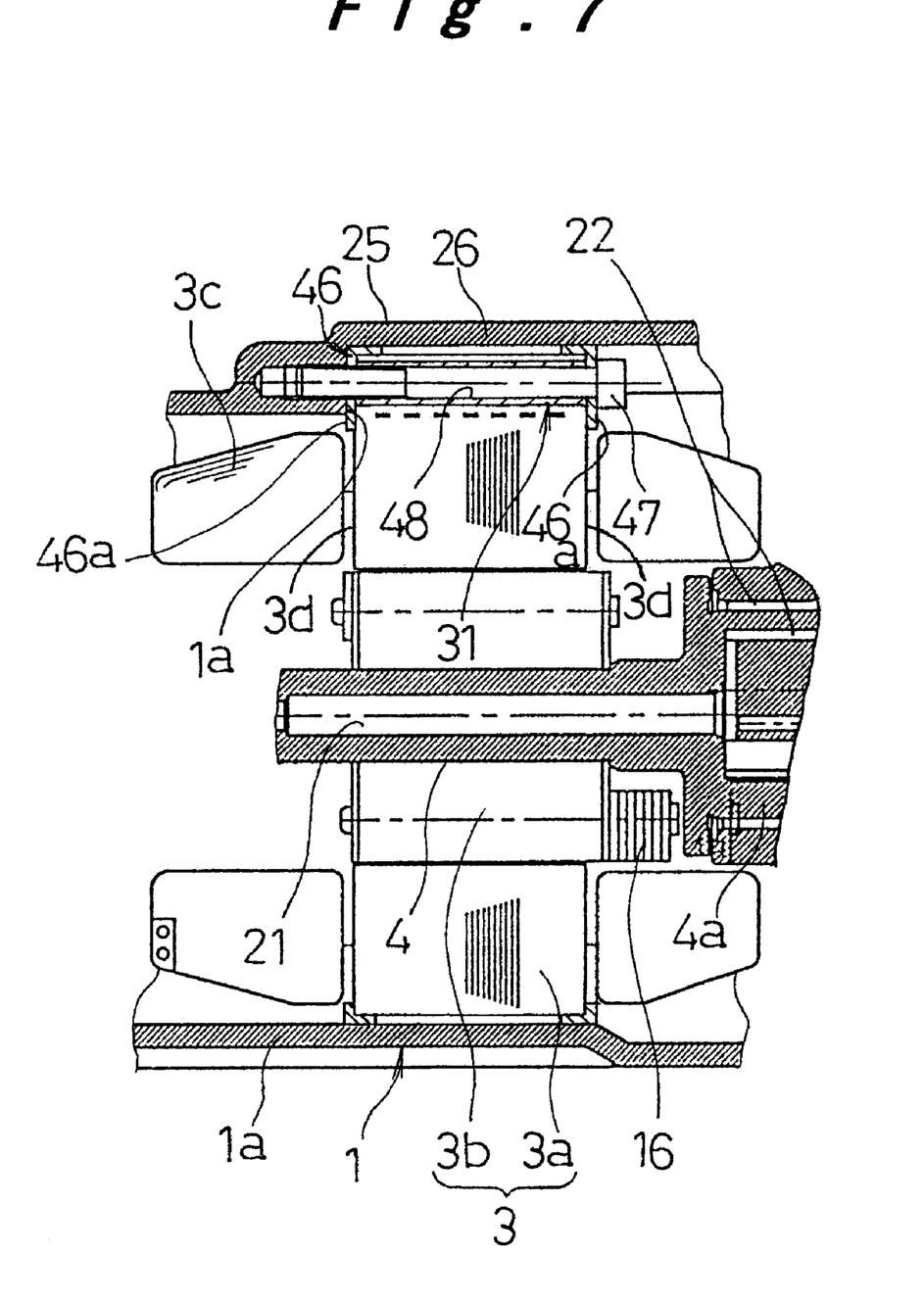
FIG. 7 is a vertical sectional view illustrating the principal portion of a compressor according to another embodiment of the present invention.
Figure 8:
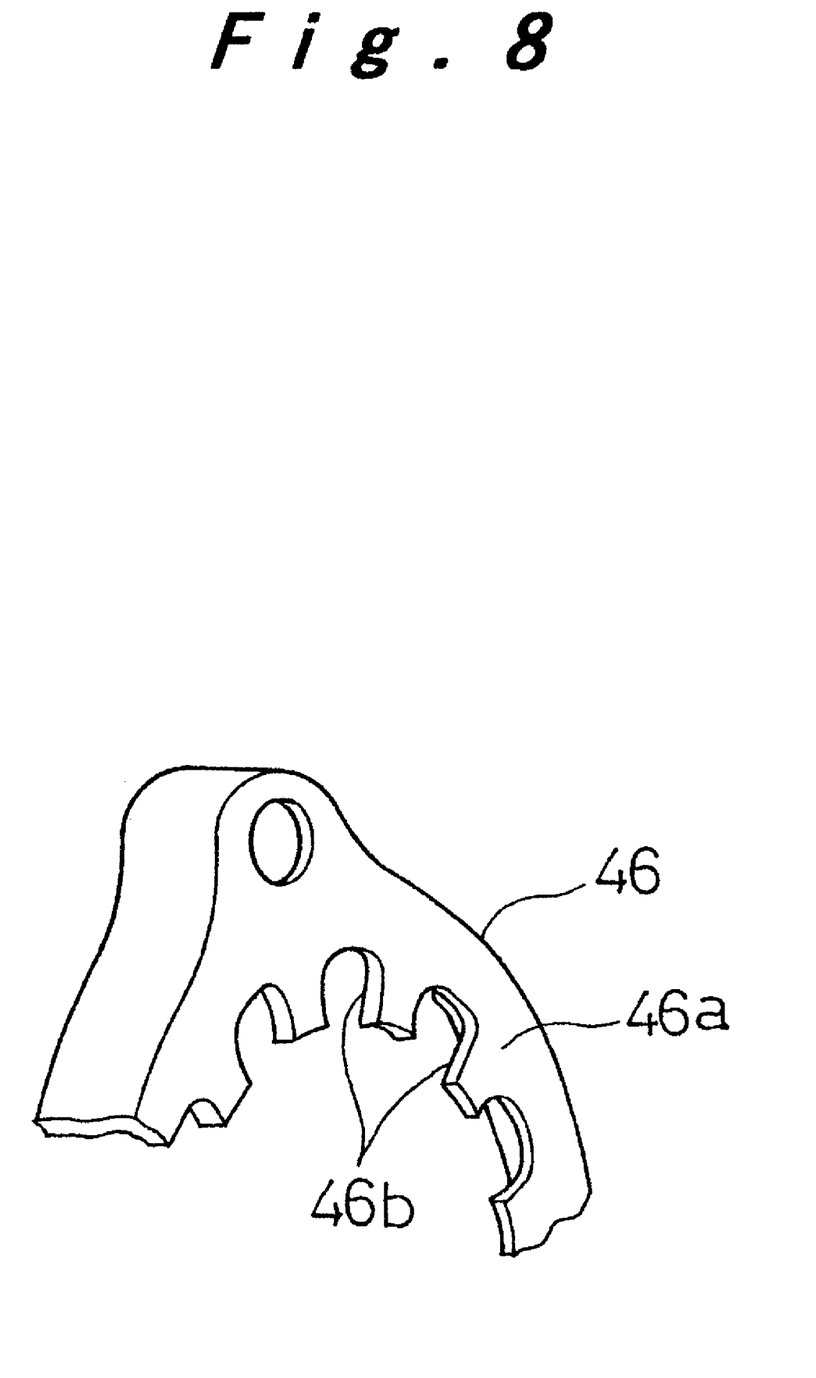
FIG. 8 a perspective view illustrating part of the insulator shown in FIG. 7.

In the example shown in FIGS. 7 and 8, the non-conductive material 31, or a molded article made of resin is realized as an insulator 46 laid firmly on the end face 3d and its periphery of the stator 3a for insulating both of the end face 3d and the periphery of the stator 3a. It also provides insulation between the end face 3d of the stator 3a and the coil end. A flange 46a of the insulator 46, which covers the end face 3d, has notches 46b formed in its inner circumference so as to correspond to the slot of the stator 3a. This makes it possible to insulate as large an area as possible in the end face 3d of the stator 3a without interference with the winding 3c, and thereby prevent the leakage of electricity from the winding 3c.

In this example, the stator 3a is fixed to a stepped surface la of the housing 1 by a bolt 47. Bolting is a fixing method suitable for cases where the stator 3a and the housing 1 cannot be shrinkage-fitted to each other for reasons of materials involving the stator 3a, the housing 1, and the non-conductive material 31. The flange 46a of the insulator 46 provides insulation between the head of the bolt 47 and the stepped surface 1a, and the end face 3d of the stator 3a. In this connection, between the inner surface of a fitting hole 48 through which the bolt 47 of the stator 3a is inserted and the periphery of the bolt 47 is also provided with a non-conductive material 31 by any of the methods described above. This prevents, even if the stator 3a is bolted to the housing 1, the stator 3a and the housing 1 from making electrical contact with each other by the bolt 47.

Water glass may also preferably be used for the non-conductive material 31, because it is stable against heat and is thus advantageous for shrinkage-fitting the stator 3a to the housing 1. Moreover, it can be easily coated around the periphery of the stator 3a.

Further, it is possible to form the non-conductive material 31 from an inorganic substance having a thermal expansion coefficient intermediate between the thermal expansion coefficient of the stator 3a and that of the housing 1 or the motor casing by means of vapor-deposition or powder coating. The non-conductive material thus realized is also stable against heat and is thus advantageous for shrinkage-fitting the stator 3a to the housing 1 or the motor casing.

It should also be noted that the application of the present invention is not limited to the above-described scroll-type compressor. For example, the invention is applicable to various types of compressors having a compression mechanism of rotary-type, reciprocating-type, or any other type, and an electric motor for driving the compression mechanism combined together, or applicable to a construction employing a vertical compression mechanism. Also, as noted above, the invention is likewise applicable to an electric motor alone which is accommodated within its own casing.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A compressor, comprising a housing; a compression mechanism accommodated in the housing; an electric motor having a rotor a stator for driving the compression mechanism, the stator being fixed to an inner surface of the housing while the rotor being fixed to an inner surface of the housing while the rotor being operatively connected to the compression mechanism; and a non-conductive member inserted between the stator of the electric motor and the housing that does not cover at least an end face of a winding to prevent the stator and the housing from making contact with each other.

2. The compressor according to claim 1, wherein the housing has a thermal expansion coefficient greater than that of the stator, and the non-conductive member has a thermal expansion coefficient greater than, at least, that of the stator.

3. The compressor according to claim 2, wherein the housing is made of non-ferrous metal.

4. The compressor according to claim 3, wherein the non-ferrous metal is aluminum.

5. The compressor according to claim 2, wherein the non-conductive member is made of a resin.

6. The compressor according to claim 5, wherein the resin is formed into a molded article to be fitted to the stator.

7. The compressor according to claim 6, wherein the molded article is composed of a plurality of bands fitted partly to a periphery of the stator.

8. The compressor according to claim 6, wherein the molded article is composed of a single cylindrical cover fitted to the stator so as to cover an entire length of a periphery of the stator.

9. The compressor according to claim 6, wherein the molded article is composed of an insulator laid firmly on an end face and a periphery of the end of the stator.

10. The compressor according to claim 5, wherein the resin is formed into a film wound on the stator.

11. The compressor according to claim 5, wherein the resin is molded on a surface of the stator.

12. The compressor according to claim 5, wherein the resin is coated around a periphery of the stator.

13. The compressor according to claim 2, wherein the non-conductive member is made of a water glass.

14. The compressor according to claim 13, wherein the water glass is coated around a periphery of the stator.

15. The compressor according to claim 2, wherein the non-conductive member is made of an inorganic substance having a thermal expansion coefficient intermediate between a thermal expansion coefficient of the stator and a thermal expansion coefficient of the housing.

16. An electric motor comprising a casing; a rotor and a stator each accommodated in the casing; and a non-conductive member inserted between the stator and the casing that does not cover at least an end face of a winding to prevent the stator and the casing from making contact with each other.

17. The electric motor according to claim 16, wherein the casing has a thermal expansion coefficient greater than that of the stator, and the non-conductive member has a thermal expansion coefficient greater than, at least, that of the stator.

18. The electric motor according to claim 17, wherein the casing is made of non-ferrous metal.

19. The electric motor according to claim 18, wherein the non-ferrous metal is aluminum.

20. The electric motor according to claim 17, wherein the non-conductive member is made of a resin.

21. The electric motor according to claim 20, wherein the resin is formed into a molded article to be fitted to the stator.

22. The electric motor according to claim 21, wherein the molded article is composed of a plurality of bands fitted partly to a periphery of the stator.

23. The electric motor according to claim 21, wherein the molded article is composed of a single cylindrical cover fitted to the stator so as to cover substantially, or approximately an entire length of the periphery of the stator.

24. The electric motor according to claim 21, wherein the molded article is composed of an insulator laid firmly on an end face and a periphery of the end of the stator.

25. The electric motor according to claim 20, wherein the resin is formed into a film wound on the stator.

26. The electric motor according to claim 20, wherein the resin is molded on a surface of the stator.

27. The electric motor according to claim 20, wherein the resin is coated around a periphery of the stator.

28. The electric motor according to claim 17, wherein the non-conductive member is made of a water glass.

29. The electric motor according to claim 28, wherein the water glass is coated around a periphery of the stator.

30. The electric motor according to claim 17, wherein the non-conductive member is made of an inorganic substance having a thermal expansion coefficient intermediate between a thermal expansion coefficient of the stator and a thermal expansion coefficient of the casing.

31. The compressor according to claim 1, wherein the non-conductive member is inserted between the stator and the housing to prevent a leakage of current from the stator to the housing.

32. The electric motor according to claim 16, wherein the non-conductive member does not interfere with a winding of the electric motor while preventing a leakage of electricity from the winding.

* * * * *